US012504639B2

(12) United States Patent
Choi

(10) Patent No.: US 12,504,639 B2
(45) Date of Patent: Dec. 23, 2025

(54) ELECTRONIC APPARATUS AND CONTROLLING METHOD THEREOF

(71) Applicant: Samsung Electronics Co., Ltd., Suwon-si (KR)

(72) Inventor: Hyeryoung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/967,871

(22) Filed: Dec. 4, 2024

(65) Prior Publication Data

US 2025/0116871 A1 Apr. 10, 2025

Related U.S. Application Data

(63) Continuation of application No. PCT/KR2024/096260, filed on Oct. 10, 2024.

(30) Foreign Application Priority Data

Oct. 10, 2023 (KR) .................. 10-2023-0134534

(51) Int. Cl.
*G02B 5/08* (2006.01)
*G02B 26/02* (2006.01)
(Continued)

(52) U.S. Cl.
CPC ............. *G02B 27/022* (2013.01); *G02B 5/08* (2013.01); *G02B 26/02* (2013.01);
(Continued)

(58) Field of Classification Search
None
See application file for complete search history.

(56) References Cited

U.S. PATENT DOCUMENTS

| 9,689,603 B2 | 6/2017 | Roh et al. |
| 10,222,888 B2 | 3/2019 | Nam et al. |

(Continued)

FOREIGN PATENT DOCUMENTS

| JP | 2014-238434 | 12/2014 |
| KR | 10-2014-0120516 | 10/2014 |

(Continued)

OTHER PUBLICATIONS

International Search Report, PCT/ISA/210, dated Jan. 9, 2025, in PCT Application No. PCT/KR2024/096260.

(Continued)

*Primary Examiner* — Parul H Gupta
(74) *Attorney, Agent, or Firm* — STAAS & HALSEY LLP

(57) ABSTRACT

An electronic apparatus including a mirror display, a sensor, memory storing one or more instructions, and one or more processors connected to the mirror display, the sensor and the memory to control the electronic apparatus. The one or more processors are configured to, by executing the one or more instructions, based identifying that a user's face approaches the mirror display within a predetermined distance based on first data obtained via the sensor when the mirror display is in a mirror state and that the user exhales based on second data obtained via the sensor, control the mirror display to enter a drawing state by processing an area of the mirror display to be opaque based on the second data, and control the mirror display so that reflectivity of an area corresponding to a user gesture input in the opaque area increases.

20 Claims, 16 Drawing Sheets

(51) Int. Cl.
*G02B 27/00* (2006.01)
*G02B 27/02* (2006.01)
*G06F 3/00* (2006.01)
*G06F 3/01* (2006.01)
*G06F 3/16* (2006.01)
*G09G 3/20* (2006.01)

(52) U.S. Cl.
CPC ......... *G02B 27/0093* (2013.01); *G06F 3/002* (2013.01); *G06F 3/017* (2013.01); *G06F 3/16* (2013.01); *G09G 3/2092* (2013.01); *G09G 2354/00* (2013.01)

(56) References Cited

U.S. PATENT DOCUMENTS

| | | | |
|---|---|---|---|
| 10,365,888 | B2 | 7/2019 | Lee et al. |
| 10,440,319 | B2 | 10/2019 | Han et al. |
| 11,403,848 | B2 | 8/2022 | Choi et al. |
| 2013/0108229 | A1* | 5/2013 | Starner .............. G02B 27/0101 385/119 |
| 2013/0215347 | A1* | 8/2013 | Tsukio ................ G03B 21/005 349/63 |
| 2014/0351761 | A1* | 11/2014 | Bae ..................... G06F 3/04817 715/835 |
| 2017/0082850 | A1* | 3/2017 | Shim ................... G09G 3/3413 |
| 2018/0059774 | A1 | 3/2018 | Lee et al. |

FOREIGN PATENT DOCUMENTS

| | | |
|---|---|---|
| KR | 10-1464431 | 11/2014 |
| KR | 10-2016-0062375 | 6/2016 |
| KR | 10-2017-0004160 | 1/2017 |
| KR | 10-2018-0023609 | 3/2018 |
| KR | 10-2128886 | 7/2020 |
| KR | 10-2263154 | 6/2021 |
| KR | 10-2022-0044467 | 4/2022 |
| KR | 10-2473669 | 12/2022 |
| KR | 10-2556965 | 7/2023 |
| KR | 10-2570009 | 8/2023 |

OTHER PUBLICATIONS

Written Opinion, PCT/ISA/237, dated Jan. 9, 2025, in PCT Application No. PCT/KR2024/096260.

* cited by examiner

ELECTRONIC APPARATUS AND CONTROLLING METHOD THEREOF

CROSS-REFERENCE TO RELATED APPLICATION(S)

This application is a bypass continuation of International Application No. PCT/KR2024/096260, filed on Oct. 10, 2024, which is based on and claims priority to Korean Patent Application No. 10-2023-0134534, filed on Oct. 10, 2023, in the Korean Intellectual Property Office, the disclosures of which are incorporated by reference herein in their entireties.

BACKGROUND

1. Field

The present disclosure relates to an electronic apparatus and a controlling method thereof, and more particularly to, an electronic apparatus having a mirror display and a controlling method thereof.

2. Description of the Related Art

With the development of electronic technology, various types of electronic apparatuses have been developed and popularized. In particular, display devices, which are used in various places such as homes, offices, and public spaces, have been continuously developing in recent years.

For example, various types of services can be provided through a mirror display that provides both a mirror function and a display function. For example, a mirror display acts as a mirror due to reflectivity when no image is displayed on the display, and when an image is played, the mirror display operates to show the image to the user due to transmittance.

SUMMARY

An electronic apparatus according to one or more embodiments includes a mirror display, one or more sensors, one or more memories storing one or more instructions, and one or more processors configured to, by executing the one or more instructions, while the mirror display is in a mirror state in which the mirror display performs a mirror function, based on a distance between the mirror display and a user being less than a predetermined value identified from first data obtained via one or more sensors of the one or more sensors, and breath of the user detected from second data obtained via one or more sensors of the one or more sensors, control the mirror display so that an area of the mirror display is in an opaque drawing state in which the area is processed to be opaque and a drawing function is performable by the mirror display in the area, and control the mirror display to adjust a degree of opacity of an area corresponding to a gesture input of the user in the area that is in the opaque drawing state, to thereby perform the drawing function.

The one or more sensors may include at least one of a camera, a microphone, a $CO_2$ sensor, or a barometric pressure sensor, that obtains the second data.

The one or more processors may be configured to, by executing the one or more instructions, identify intensity of the breath from the second data, and control the mirror display to adjust a degree of opacity of the area that is in the opaque drawing state.

The one or more processors may be configured to, by executing the one or more instructions, identify intensity of the breath from the second data, and control the mirror display to adjust a size of the area that is in the opaque drawing state based on the intensity of the breath.

The one or more processors may be configured to, by executing the one or more instructions, based on detecting the breath, identify an area corresponding to a mouth of the user based on an image of the user, and control the mirror display so that the degree of opacity decreases, based on the intensity of the breath, as opacity extends outwardly from the area corresponding to the mouth.

The one or more processors may be configured to, by executing the one or more instructions, based on detecting the breath, identify an area corresponding to a mouth of the user based on sound received through a microphone, and control the mirror display so that the degree of opacity decreases, based on the intensity of the breath, as opacity extends outwardly from the area corresponding to the mouth.

The one or more processors may be configured to, by executing the one or more instructions, control the mirror display so that reflectivity of the area corresponding to the gesture input in the area that is in the opaque drawing state is the same as reflectivity of an area of the mirror display that is outside of the area that is in the opaque drawing state and is not processed to be opaque.

The one or more processors may be configured to, by executing the one or more instructions, control the mirror display to terminate the opaque drawing state by returning the area that is in the opaque drawing sate to an original state after different time periods according to intensities of the breath, respectively.

The one or more processors may be configured to, by executing the one or more instructions, identify an object based on a drawing shape indicated by the gesture input, and control the mirror display to display a graphic object corresponding to the object based on a location of the user reflected on the mirror display.

The one or more processors may be configured to, by executing the one or more instructions, identify a relationship with the user based on a type of the identified object, and control the mirror display to display a graphic object corresponding to the object based on the relationship with the user and the location of the user reflected on the mirror display.

The mirror display may include a plurality of pixel areas, each pixel area of the plurality of pixel areas may be configured so that a display element is positioned in a center of the pixel area and a mirror element is positioned at a border of the pixel area. The one or more processors may be configured to, by executing the one or more instructions, process the area that is in the opaque drawing state to be opaque by controlling at least one display element of at least one pixel area in the area that is in the opaque drawing state of the plurality of pixel areas to display a first color, and control at least one display element of at least one pixel area in the area that is in the opaque drawing state of the plurality of pixels areas to display a second color or to be turned off so that reflectivity of the area corresponding to the gesture input increases.

A controlling method according to one or more embodiments is provided for an apparatus that includes a mirror display and one or more sensors. The method may include, while the mirror display is in a mirror state in which the mirror display performs a mirror function, based on a distance between the mirror display and a user being less than a predetermined value identified from first data obtained via one or more sensors of the one or more sensors, and breath of the user detected from second data obtained via one or more sensors of the one or more sensors, controlling the mirror display so that an area of the mirror display is in an opaque drawing state in which the area is processed to be opaque and a drawing function is performable by the mirror display in the area, and controlling the mirror display to adjust a degree of opacity of an area corresponding to a gesture input of the user in the area that is in the opaque drawing state, to thereby perform the drawing function A non-transitory computer-readable medium according to one or more embodiments may store computer instructions that, when executed by one or more processors of an apparatus that includes a mirror display and one or more sensors, cause the apparatus to perform operations, and the operations may include, while the mirror display is in a mirror state in which the mirror display performs a mirror function, based on a distance between the mirror display and a user being less than a predetermined value identified from first data obtained via one or more sensors of the one or more sensors, and breath of the user detected from second data obtained via one or more sensors of the one or more sensors, control the mirror display so that an area of the mirror display is in an opaque drawing state in which the area is processed to be opaque and a drawing function is performable by the mirror display in the area, and control the mirror display to adjust a degree of opacity of an area corresponding to a gesture input of the user in the area that is in the opaque drawing state, to thereby perform the drawing function.

BRIEF DESCRIPTION OF THE DRAWINGS

The above and other aspects, features and advantages of certain embodiments of the present disclosure will become more apparent from the following description with reference to the accompanying drawings.

DETAILED DESCRIPTION

Figure 1:
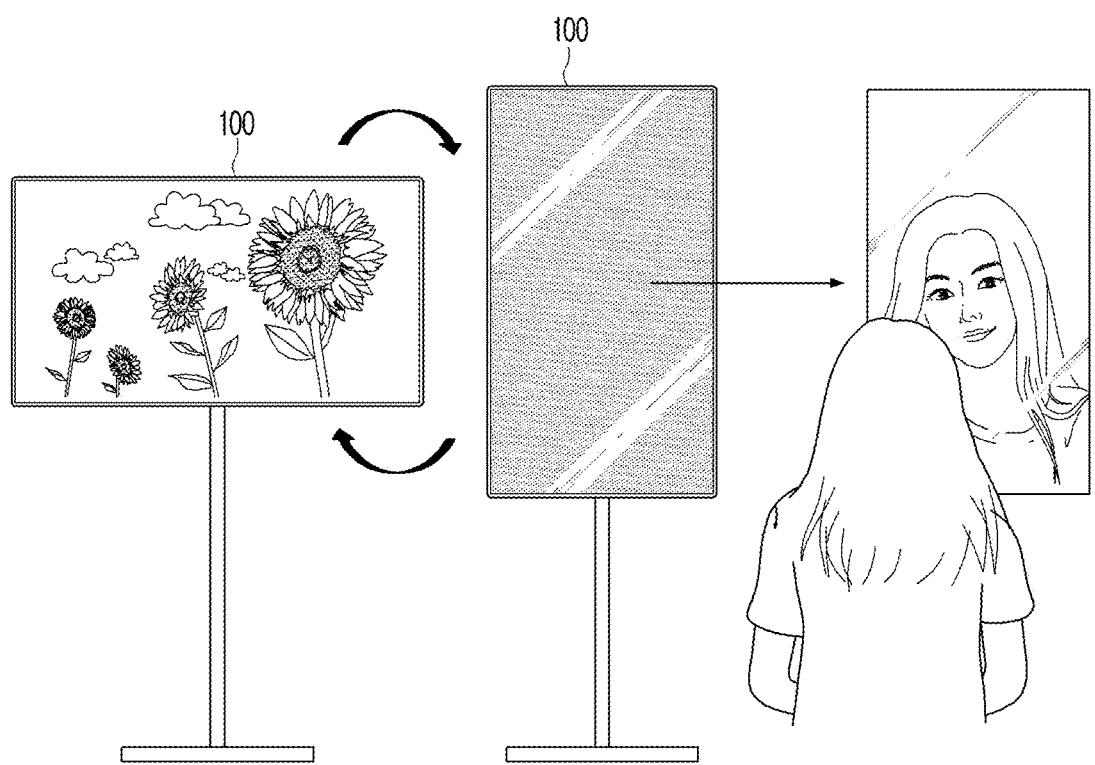
FIG. 1 is a view provided to explain how a mirror display is used according to one or more embodiments.

After briefly describing terms used in this specification, the present disclosure will be described in detail.

General terms that are currently widely used are selected as the terms used in the embodiments of the disclosure in consideration of their functions in the disclosure, but may be changed based on the intention of those skilled in the art or a judicial precedent, the emergence of a new technique, or the like. In addition, in a specific case, terms arbitrarily chosen by an applicant may exist, in which case, the meanings of such terms will be described in detail in the corresponding descriptions of the disclosure. Therefore, the terms used in the embodiments of the disclosure need to be defined on the basis of the meanings of the terms and the overall contents throughout the disclosure rather than simple names of the terms.

In the disclosure, the expressions "have", "may have", "include" or "may include" indicate existence of corresponding features (e.g., components such as numeric values, functions, operations, or components), but do not exclude presence of additional features.

In the disclosure, the expressions "A or B", "at least one of A or/and B", "at least one of A, B, and C", "at least one of A, B, or C", "one or more of A or/and B", and the like may include any and all combinations of one or more of the items listed together. For example, the term "A or B", "at least one of A and B", or "at least one of A or B" may refer to all of the case (1) where only A is included, the case (2) where only B is included, or the case (3) where both A and B are included.

Expressions "first", "second", "1st," "2nd," or the like, used in the disclosure may indicate various components regardless of sequence and/or importance of the components, will be used only in order to distinguish one component from the other components, and do not limit the corresponding components.

When it is described that an element (e.g., a first element) is referred to as being "(operatively or communicatively) coupled with/to" or "connected to" another element (e.g., a second element), it should be understood that it may be directly coupled with/to or connected to the other element, or they may be coupled with/to or connected to each other through an intervening element (e.g., a third element).

An expression "~configured (or set) to" used in the disclosure may be replaced by an expression, for example, "suitable for," "having the capacity to," "~designed to," "~adapted to," "~made to," or "~capable of" depending on a situation. A term "~configured (or set) to" may not necessarily mean "specifically designed to" in hardware.

In some situations, an expression "~an apparatus configured to" may mean that an apparatus "is capable of" together with other apparatuses or components. For example, a "processor configured (or set) to perform A, B, and C" may mean a dedicated processor (e.g., an embedded processor) for performing the corresponding operations or a generic-purpose processor (e.g., a central processing unit (CPU) or an application processor) that may perform the corresponding operations by executing one or more software programs stored in a memory apparatus.

Singular expressions include plural expressions unless the context clearly dictates otherwise. In this specification, terms such as "comprise" or "have" are intended to designate the presence of features, numbers, steps, operations, components, parts, or a combination thereof described in the specification, but are not intended to exclude in advance the possibility of the presence or addition of one or more of other features, numbers, steps, operations, components, parts, or a combination thereof.

In exemplary embodiments, a "module" or a "unit" may perform at least one function or operation, and be implemented as hardware or software or be implemented as a combination of hardware and software. In addition, a plurality of "modules" or a plurality of "units" may be integrated into at least one module and be implemented as at least one processor (not shown) except for a 'module' or a 'unit' that needs to be implemented as specific hardware.

Meanwhile, various elements and regions in the drawings are schematically drawn in the drawings. Therefore, the technical concept of the disclosure is not limited by a relative size or spacing drawn in the accompanying drawings.

Hereinafter, an embodiment of the present disclosure will be described in greater detail with reference to the accompanying drawings.

FIG. 1 is a view provided to explain how a mirror display is used according to one or more embodiments.

An electronic apparatus 100 according to an embodiment, may be implemented as various types of mirror display devices which are installed in various places where a mirror is needed and capable of conveying information while providing a mirror function. Here, the term "mirror display" is a combination of "mirror" meaning a mirror and "display" meaning the work of visually representing information. Such a mirror display requires the ability to provide at least one of a mirror function or a display function in a timely manner according to the needs of the user. According to an embodiment, the electronic apparatus 100 may operate in a display state providing a display function and a mirror state providing a mirror function.

The electronic apparatus 100, according to an embodiment may operate in one of a landscape orientation and a portrait orientation, as shown in FIG. 1. For example, a landscape state (or landscape mode) in which the electronic apparatus 100 is positioned in a landscape orientation may be an operation state in which the horizontal length of the display 110 is longer than the vertical length. In addition, a portrait state (or portrait mode) in which the electronic apparatus 100 is positioned in a portrait orientation may be an operation state in which the vertical length of the display 110 is longer than the horizontal length. However, the landscape state may also be referred to as a landscape orientation or a landscape posture, and the portrait state may also be referred to as a portrait orientation or a portrait posture. According to an embodiment, the electronic apparatus 100 may utilize a pivot function to rotate the mirror display. However, the operation states of the electronic apparatus 100 are not limited to the landscape and portrait states, and the electronic apparatus 100 may also operate in a tilted state at a specific angle (e.g., tilted at an angle in a diagonal direction) based on a user command.

According to an embodiment, the electronic apparatus 100 may change from a landscape state to a portrait state, or from a portrait state to a landscape state, based on a user command. However, in some cases, the operation state may be automatically changed based on the type of image, the surrounding environment, etc. For example, the electronic apparatus 100 may receive a user command to change the operation state from a user terminal and/or a remote controller capable of perform remote control using an application, such as a smartphone, or the like, or may receive a user command to change the operation state via a button provided on the electronic apparatus 100, a user voice, a gesture, or the like. The electronic apparatus 100 may perform communication with a user terminal and/or a remote controller via a communication method such as Wi-Fi communication, Bluetooth communication, infrared communication, or the like.

Figure 2:
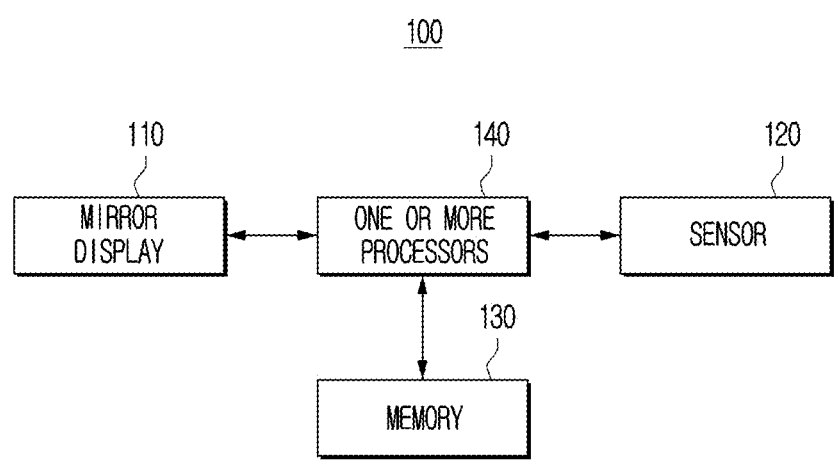
FIG. 2 is a block diagram illustrating configuration of an electronic apparatus according to one or more embodiments.

FIG. 2 is a block diagram illustrating configuration of an electronic apparatus according to one or more embodiments.

Referring to FIG. 2, the electronic apparatus 100 includes a mirror display 110, a sensor 120, a memory 130, and one or more processors 140. According to an embodiment, the electronic apparatus 100 may be implemented as a switchable mirror device that provides a mirror function and a display function.

The electronic apparatus 100 may be implemented as various devices having a display function, such as a window display, a vehicle display (vehicle window), a monitor, a smart monitor, a smart TV, an electronic picture frame, an electronic blackboard, an electronic table, a laptop, a digital signage, a digital information display (DID), a video wall, and the like.

The mirror display 110 may be implemented as a display including a self-light emitting device or a display including a non-light emitting device and a backlight. For example, the mirror display 110 may be implemented as various types of displays such as liquid crystal display (LCD), organic light emitting diodes (OLED) display, Light Emitting Diodes (LED), micro LED, Mini LED, Plasma Display Panel (PDP), Quantum dot (QD) display, quantum dot light-emitting diode (QLED) display, and the like. The mirror display 110 may also include a driving circuit that can be implemented in the form of Amorphous Silicon Thin-Film Transistor (a-si TFT), low temperature poly silicon Thin-Film Transistor (LTPS TFT), Organic Thin-Film Transistor (OTFT), etc., a backlight unit, etc. According to an embodiment, a touch sensor that detects a touch operation in the form of a touch film, a touch sheet, a touch pad, etc. may be disposed on the front of the mirror display 110 so as to be implemented to detect various types of touch inputs. For example, the mirror display 110 may detect various types of touch inputs such as a touch input by the user's hand, a touch input by an input device such as a stylus pen, and a touch input by a specific electrostatic material. Here, the input device may be implemented as a pen-type input device that may be referred to as various terms such as an electronic pen, a stylus pen, an S-pen, etc. According to an embodiment, the mirror display 110 may be implemented as a flat display, a curved display, a flexible display that can be folded or/and rolled, etc.

Meanwhile, the mirror display 110 may be implemented as a display that provides a mirror function and a display function.

For example, the mirrored display 110 may be implemented in the form of a switchable mirror added to a conventional display panel.

Figure 3A:
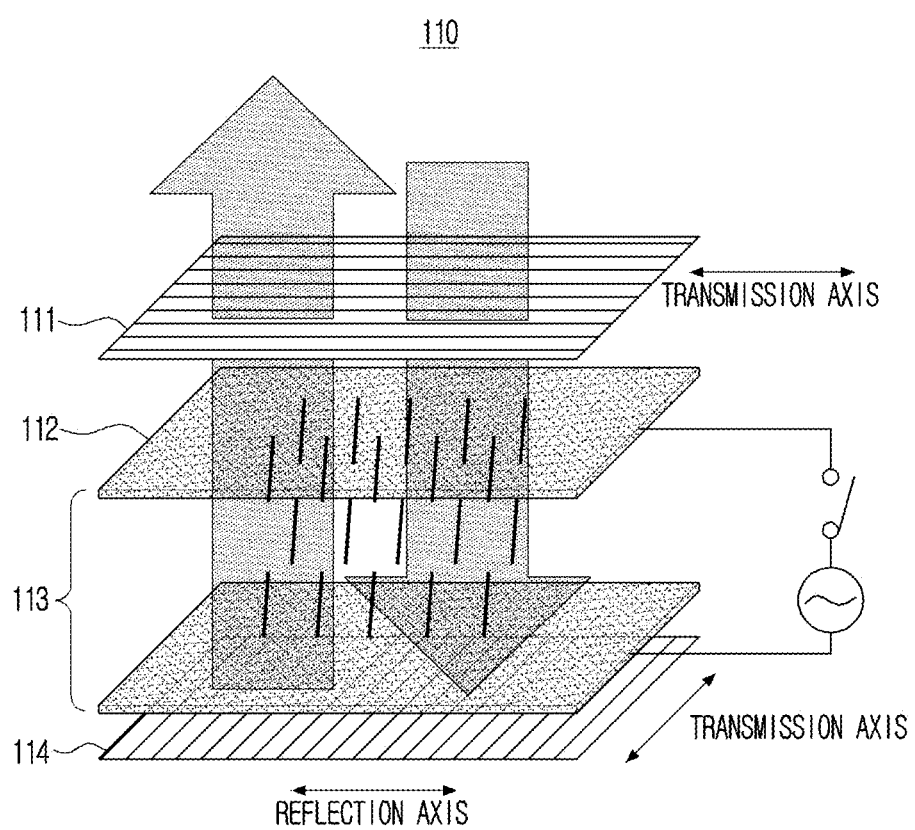
FIGS. 3A and 3B are views provided to explain a structure of a mirror display according to one or more embodiments.
Figure 3B:
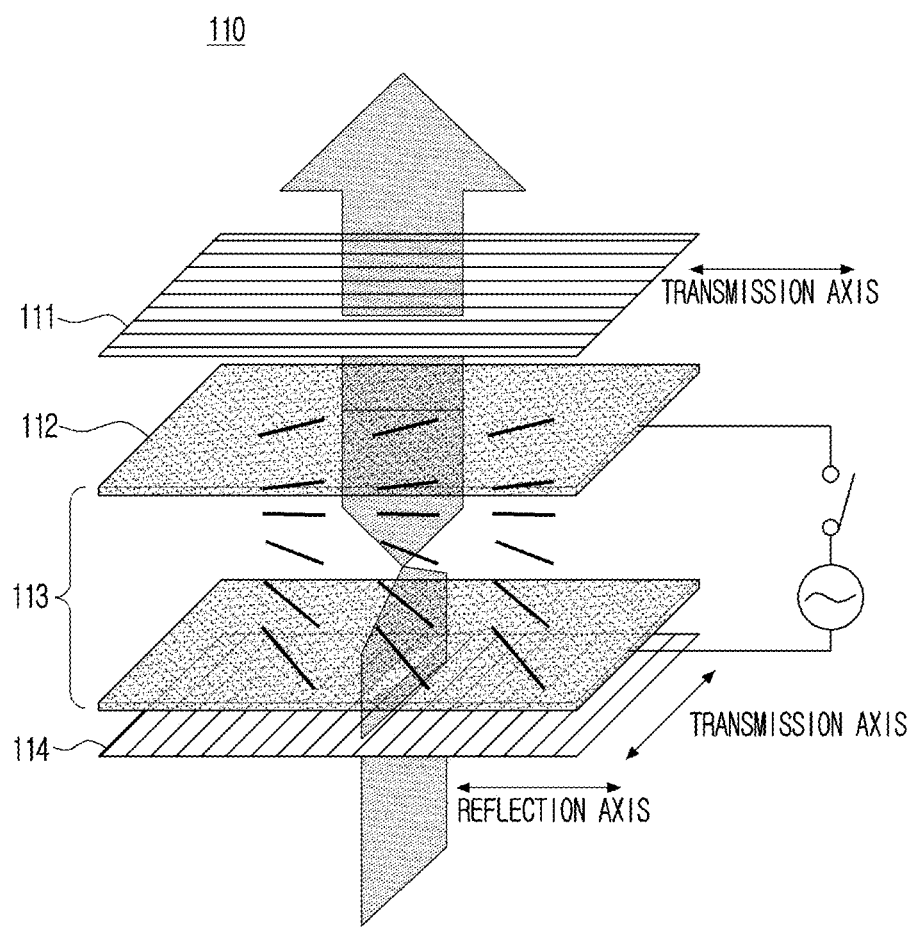

As shown in FIGS. 3A and 3B, a mirror display 210 may be implemented in a form that includes a polarizer 111, an upper glass 112, a lower glass 114, and a reflective polarizer 115. According to an embodiment, a liquid crystal (LC) layer 113 may be formed between the upper glass 112 and the lower glass 114. The liquid crystal (LC) may in an intermediate state between a liquid and a crystal, and may have a structure in which rod-shaped molecules (liquid crystal molecules) are aligned in one direction similar to a solid crystal.

According to an embodiment, the polarizer 111 may be implemented to transmit polarized light. According to an embodiment, the upper glass 112 and the lower glass 114 may be implemented as transparent conductive oxide (TCO) glass, but are not limited to the TCO glass.

FIG. 3A illustrates the mirror display 110 when the voltage is turned off. When the voltage is turned off, the liquid crystal molecules maintain a vertical state, and the incident polarized light may be reflected to the reflection axis of the reflective polarizer (115) by passing through the LC (liquid crystal) layer (113). Accordingly, the mirror display (110) may operate in a mirror state.

FIG. 3B illustrates the mirror display 110 when the voltage is turned on, and when the voltage is turned on, the liquid crystal molecules remain collapsed and twisted, and the incident polarized light may be rotated 90 degrees and transmitted through the reflective axis of the reflective polarizer 115. Accordingly, the mirror display 110 may operate in a display state. Depending on the implementation, the mirror display 110 may further include a protective film that serves to protect the polarizer, a film that serves to sort light from the polarizer, and the like.

The sensor 120 may sense the presence of the user in front of the electronic apparatus 100, the distance to the user, the user's approach speed, the user's current location, the direction (or angle) in which the user is located, changes in the user's location within a preset time range, the user's actions, etc. In this case, the sensor 120 may be implemented as various types of sensors capable of sensing the user. For example, the sensor 120 may include at least one sensor of a Time of Flight (ToF) sensor, an ultrasonic sensor, a RADAR sensor, a photodiode sensor, a proximity sensor, a Passive Infrared Sensor (PIR) sensor, a pinhole sensor, a pinhole camera, an infrared human body detection sensor, a CMOS image sensor, a heat detection sensor, a light sensor, or a motion detection sensor. For example, when the sensor 120 is implemented as an infrared human body detection sensor (e.g., an Infrared Ray (IR) Time of Flight (ToF) type sensor), the presence or absence of the user, the approach speed, the current location, the location change, etc. may be sensed based on the time at which the emitted infrared rays are reflected and received.

In addition, the sensor 120 may include at least one of a camera, a microphone, a CO2 sensor, or a barometric sensor. The microphone is configured to receive a user voice or other sound and convert them into audio data. The CO2 sensor is a sensor for measuring carbon dioxide concentration. The barometric sensor is a sensor for sensing the surrounding pressure.

In addition, the sensor 120 may further include at least one sensor capable of sensing ambient illuminance, ambient temperature, light incidence direction, etc. In this case, the sensor 120 may be implemented as an illuminance sensor, a temperature detection sensor, a light amount sensing layer, a camera, etc. As an example, the illuminance sensor may be disposed inside the glass provided in the mirror display 110, and in this case, the sensing function may be controlled to operate normally even inside the glass through an algorithm that compensates for the transmittance/reflectivity of the glass provided in the mirror display 110.

In addition, the sensor 120 may further include at least one of an acceleration sensor (or a gravity sensor), a geomagnetic sensor, or a gyro sensor. For example, the acceleration sensor may be a three-axis acceleration sensor. The three-axis acceleration sensor may measure gravitational acceleration for each axis and provide raw data to the processor 140. The geomagnetic sensor or the gyro sensor may be used to obtain posture information. Here, the posture information may include at least one of roll information, pitch information, or yaw information.

Figure 3C:
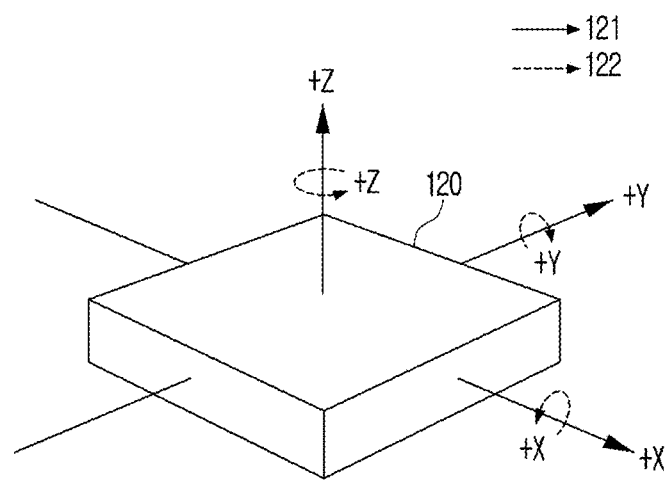
FIG. 3C is a view provided to explain sensing data obtained by a sensor according to one or more embodiments.

For example, the processor 140 may identify a direction and an angle, at which the mirror display 110 is tilted, based on sensing values of the acceleration sensor and the gyro sensor. For example, as shown in FIG. 3C, the processor 140 may identify the direction and the angle, at which the mirror display 110 is tilted, based on a sensing value of an acceleration sensor 121 and a sensing value of the gyro sensor 122.

The memory 130 may store data required for various embodiments. The memory 130 may be implemented as a memory embedded in the electronic apparatus 100' or as a memory detachable from the electronic apparatus 100 depending on the data storage purpose. For example, in the case of data for driving the electronic apparatus 100, the data may be stored in the memory embedded in the electronic apparatus 100, and in the case of data for the expansion function of the electronic apparatus 100, the data may be stored in a memory detachable from the electronic apparatus 100. Meanwhile, in the case of the memory embedded in the electronic apparatus 100, the memory may be implemented as at least one of a volatile memory (e.g. a dynamic RAM (DRAM), a static RAM (SRAM), or a synchronous dynamic RAM (SDRAM)) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g. a NAND flash or a NOR flash), a hard drive, or a solid state drive (SSD)). In the case of the memory detachable from the electronic apparatus 100', the memory may be implemented in the form of a memory card (e.g., a compact flash (CF), a secure digital (SD), a micro secure digital (Micro-SD), a mini secure digital (Mini-SD), an extreme digital (xD), or a multi-media card (MMC)), an external memory connectable to a USB port (e.g., a USB memory), or the like.

According to an embodiment, the memory 130 may store a computer program including at least one instruction or instructions for controlling the electronic apparatus 100.

In accordance with other embodiments, the memory 130 may store video, i.e., input video, received from an external device (e.g., a source device), an external storage medium (e.g., USB), an external server (e.g., a web hard), or the like. Alternatively, the memory 130 may store video obtained via a camera provided in the electronic apparatus 100.

In accordance with another embodiment, the memory 130 may store various information required for image quality processing, such as information, algorithms, image quality parameters, etc. for performing at least one of noise reduction, detail enhancement, tone mapping, contrast enhancement, color enhancement, or frame rate conversion.

According to an embodiment, the memory 130 may be implemented as a single memory that stores data generated by various operations according to the present disclosure. However, according to other embodiments, the memory 130 may be implemented to include a plurality of memories that each store different types of data, or that each store data generated at different stages.

The memory 130 stores transmission characteristic information and reflection characteristic information of the mirror display 110.

Here, the transmission characteristic information of the mirror display 110 may include information about a luminance value according to a grayscale of an image signal determined based on the transmittance of the mirror display 110. For example, the luminance characteristic information of the mirror display 110 may be a luminance measurement value according to a grayscale of an image signal. In other words, since the mirror display 110 has a fixed transmittance, by inputting an image signal for each grayscale, the luminance value according to the grayscale of the image signal may be obtained. In other words, by inputting an image signal of 0 IRE (Institute of Radio Engineers) (black) ~100 IRE (white) (for example, an image of 0~255 grayscale in the case of an 8-bit image), the luminance measurement value according to the grayscale of the input image signal may be calculated and stored in the memory (130). Such a luminance measurement value according to the grayscale of the image signal is also referred to as a gamma table (or gamma curve), which may be directly measured by experiment, but may also be estimated based on the transmittance of the mirror display 110.

Meanwhile, the reflection characteristic information of the mirror display 110 may include at least one of reflectivity information of the mirror display 110 or reflection luminance of the mirror display 110 with respect to an external light amount. According to an embodiment, the reflection characteristic information may be the reflectivity of the mirror display 110 itself. In this case, the reflection luminance with respect to the external light amount according to an embodiment of the present invention may be calculated based on the external light amount and reflectivity measured by the sensor 120. According to another embodiment, the reflection characteristic information may be information in the form of a previously measured or calculated reflection luminance of the mirror display (110) according to the external light amount. Here, the reflection luminance of the mirror display (110) may be a luminance value generated as external light is reflected based on the reflectivity of the mirror display (110).

However, the luminance characteristic information and the reflection characteristic information of the mirror display 110 may also be received from an external server or the like. For example, when the luminance characteristic information corresponding to identification information (e.g., manufacturing number, model) of the mirror display 110 is stored in an external server, the electronic apparatus 100 may receive such information from the external server.

The one or more processors 140 control the overall operations of the electronic apparatus 100. Specifically, the one or more processors 140 may be connected to each configuration of the electronic apparatus 100 to control the overall operations of the electronic apparatus 100. For example, the one or more processors 140 may be electrically connected to the mirror display 110 and the memory 130 to control the overall operations of the electronic apparatus 100. The one or more processors 140 may consist of one or a plurality of processors.

The one or more processors 140 may perform the operations of the electronic apparatus 100 according to various embodiments by executing at least one instruction stored in the memory 130.

The one or more processors 140 may include one or more of a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The one or more processors 140 may control one or any combination of the other components of the electronic apparatus, and may perform communication-related operations or data processing. The one or more processors 140 may execute one or more programs or instructions stored in memory. For example, the one or more processors may perform a method according to one or more embodiments by executing one or more instructions stored in the memory.

When a method according to an embodiment includes a plurality of operations, the plurality of operations may be performed by one processor or by a plurality of processors. For example, when a first operation, a second operation, and a third operation are performed by the method according to one or more embodiments, all of the first operation, the second operation, and the third operation may be performed by the first processor, or the first operation and the second operation may be performed by the first processor (e.g., a general-purpose processor) and the third operation may be performed by the second processor (e.g., an artificial intelligence-dedicated processor).

The one or more processors 140 may be implemented as a single core processor comprising a single core, or as one or more multicore processors including a plurality of cores (e.g., homogeneous multicore or heterogeneous multicore). When the one or more processors 140 are implemented as multicore processors, each of the plurality of cores included in a multicore processor may include a processor internal memory, such as a cache memory and an on-chip memory, and a common cache shared by the plurality of cores may be included in the multicore processor. Further, each of the plurality of cores (or some of the plurality of cores) included in the multi-core processor may independently read and perform program instructions to implement the method according to one or more embodiments, or all (or some) of the plurality of cores may be coupled to read and perform program instructions to implement the method according to one or more embodiments.

When a method according one or more embodiments includes a plurality of operations, the plurality of operations may be performed by one core of a plurality of cores included in a multi-core processor, or may be performed by a plurality of cores. For example, when a first operation, a second operation, and a third operation are performed by a method according to one or more embodiments, all of the first operation, the second operation, and the third operation may be performed by the first core included in the multi-core processor, or the first operation and the second operation may be performed by the first core included in the multi-core processor and the third operation may be performed by the second core included in the multi-core processor.

In the embodiments of the present disclosure, the processors may mean a system-on-chip (SoC) in which one or more processors and other electronic components are integrated, a single-core processor, a multi-core processor, or a core included in a single-core processor or multi-core processor and here, the core may be implemented as CPU, GPU, APU, MIC, DSP, NPU, hardware accelerator, or machine learning accelerator, etc., but the core is not limited to the embodiments of the present disclosure. Hereinafter, for convenience of explanation, one or more processors 140 will be referred to as the 'processor 140.'

According to an embodiment, when the electronic apparatus 100 is changed from a landscape orientation to a portrait orientation, the processor 140 may identify, based on data obtained via the sensor 120, whether the user is positioned within a predetermined distance from the mirror display 110 for more than a predetermined time. When it is identified that the user is positioned within the predetermined distance from the mirror display 110 for more than the predetermined time, the processor 140 may control the mirror display 110 to operate in a mirror state.

According to an embodiment, the processor 140 may identify whether the distance between the mirror display 110 and the user is below a predetermined value based on first data obtained via the sensors 120 while the mirror display 110 is in the mirror state. For example, the processor 140 may identify whether the user's face is within a predetermined distance from the mirror display 110 based on data obtained via the sensor such as a distance sensor, a lidar sensor, or the like.

According to an embodiment, the processor 140 may detect the user's breath based on second data obtained via the sensor 120. For example, the processor 140 may identify whether the user is exhaling based on the second data. For example, the processor 140 may identify whether the user is exhaling based on the second data obtained via at least one of a camera, a microphone, a CO2 sensor, and a barometric pressure sensor.

According to an embodiment, when the distance between the mirror display 110 and the user in the mirror state is below a predetermined value, the processor 140 may control the mirror display 110 so that the mirror display 110 is in a drawing state. For example, the processor 140 may opacify one area of the mirror display 110. For example, the processor 140 may opacify one area of the mirror display 110 by reducing the reflectivity of the one area of the mirror display 110. For example, the processor 140 may opacify one area of the mirror display 110 by changing the mirror display 110 from a mirror state to a display state and displaying a particular color (e.g., a gray color).

According to an embodiment, the processor 140 may control the mirror display 110 to adjust the degree of opacity of an area corresponding to the user's gesture input in the opaque area. For example, the processor 140 may adjust the degree of opacity of the area corresponding to the user's gesture input by controlling the mirror display 110 so that the reflectivity of the area corresponding to the user's gesture input in the opaque area is the same as the reflectivity of the area that is not processed to be opaque. For example, the processor 140 may change an area that has been switched to a display state back to a mirror state to increase reflectivity. For example, the gesture input may include various inputs such as touch input, hovering input, motion input, etc.

According to an embodiment, the processor 140 may identify the intensity of the user's breath based on the second data obtained via at least one of the camera, the microphone, the CO2 sensor, or the barometric pressure sensor. According to an embodiment, the processor 140 may control the mirror display 110 to adjust the degree of opacity of the opaque area based on the intensity of the user's breath. According to an embodiment, the processor 140 may control the mirror display 110 to adjust the size of the opaque area based on the intensity of the user's breath. According to an embodiment, the processor 140 may control the mirror display 110 to adjust the size of the opaque area based on the proximity of the user.

According to an embodiment, when the user's breath is detected, the processor 140 may identify an area corresponding to the user's mouth based on an image capturing the user. In this case, the processor 140 may control the mirror display 110 to decrease the degree of opacity as it extends outwardly from the area corresponding to the user's mouth based on the intensity of the user's breath.

For example, the processor 140 may detect the position of the user's face and identify the position of the user's mouth from the captured image obtained via the camera. Various conventional methods may be used as a method of detecting a face area. Specifically, a direct recognition method and a method using statistics can be used. The direct recognition method creates rules using physical features such as the outline, skin color, and size of components of the face image or the distance between them, and performs comparison, inspection and measurement according to those rules. The method using statistics may detect the face area according to a pre-trained algorithm. In other words, it is a method of making the unique features included in the input face into data and comparing and analyzing them with a large prepared database (shapes of faces and other objects). In particular, the face area may be detected according to a pre-trained algorithm, and methods such as MLP (Multi Layer Perceptron) and SVM (Support Vector Machine) may be used. The location of the user's mouth may be identified using a similar method.

According to an embodiment, when the user's breath is detected, the processor 140 may identify an area corresponding to the user's mouth based on sound received via the microphone. In this case, the processor 140 may control the mirror display 110 to decrease the degree of opacity as it extends outwardly from the area corresponding to the user's mouth based on the intensity of the user's breath.

According to an embodiment, the processor 140 may control the mirror display 110 to terminate the drawing state by returning the opaque area to its original state after a different amount of time based on the intensity of the user's breath.

According to an embodiment, the processor 140 may identify an object based on a drawing shape identified by the user's gesture input in the drawing state. In this case, the processor 140 may control the mirror display 110 to display a graphical object corresponding to the identified object based on the user's position reflected on the mirror display 110.

According to an embodiment, the processor 140 may identify an object based on a drawing shape identified by the user's gesture input in the drawing state. In this case, the processor 140 may identify a relationship with the user based on the type of the identified object, and may control the mirror display 110 to display a graphical object corresponding to the object based on the relationship with the user and the user's position reflected on the mirror display.

According to one example, the mirror display 110 may include a plurality of pixel areas, and each of the plurality of pixel areas may be configured to have a display element positioned in the center and a mirror element positioned on the border. In this case, the processor 140 may control the display element to display a first color to make one area of the mirrored display 110 opaque. Further, the processor 140 may control the display element to display or turn off a second color to increase the reflectivity of the area corresponding to the user's gesture input. For example, the second color may be a relatively brighter color than the first color.

Figure 4:
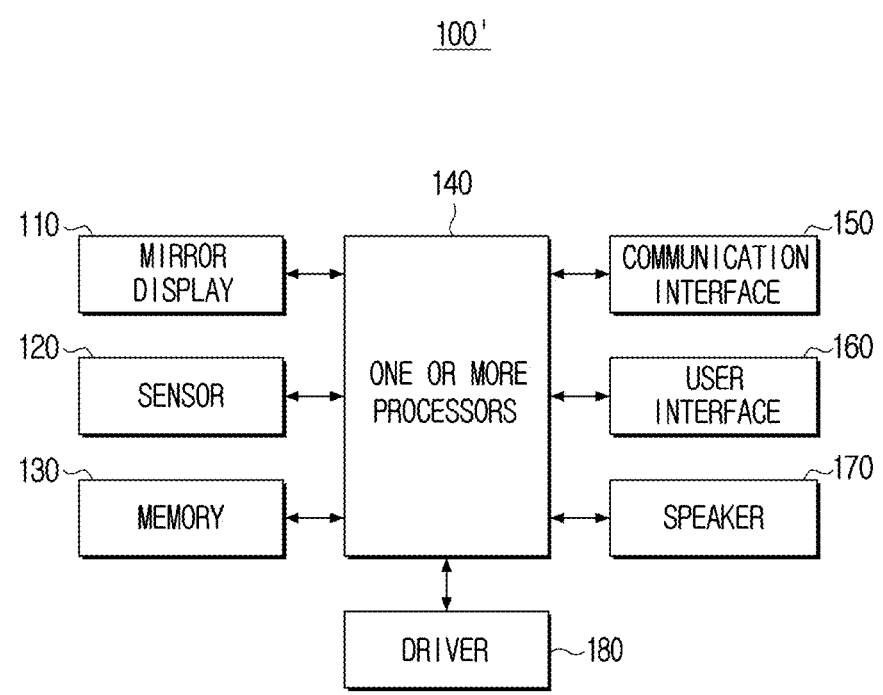
FIG. 4 is a block diagram illustrating configuration of an electronic apparatus in detail according to one or more embodiments.

FIG. 4 is a block diagram illustrating configuration of an electronic apparatus in detail according to one or more embodiments.

Referring to FIG. 4, an electronic apparatus 100' may include the mirror display 110, the sensor 120, the memory 130, the one or more processors 140, a communication interface 150, a user interface 160, a speaker 170, and a driver 180. Any configuration shown in FIG. 4 that is redundant of the configuration shown in FIG. 2 will be omitted from further description.

The communication interface 150 may be implemented as various interfaces depending on the implementation example of the electronic apparatus 100'. For example, the communication interface 150 may perform communication with an external device, an external storage medium (e.g., a USB memory), an external server (e.g., a web hard), etc. through communication methods such as Bluetooth, AP-based Wireless LAN Network (Wi-Fi), Zigbee, wired or wireless Local Area Network (LAN), Wide Area Network (WAN), Ethernet, IEEE 1394, High-Definition Multimedia Interface (HDMI), Universal Serial Bus (USB), Mobile High-Definition Link (MHL), Audio Engineering Society/European Broadcasting Union (AES/EBU), Optical, Coaxial, etc. According to an embodiment, the communication interface 150 may perform communication with other electronic apparatuses, external servers, and/or remote control devices, etc.

The user interface 160 may be implemented as a device such as a button, a touch pad, a mouse, and a keyboard, or may be implemented as a touch screen or the like that can also perform the above-described display function and a manipulation input function together.

The speaker 170 is configured to output not only various audio data but also various notification sound, voice messages, and the like. The processor 140 may control the speaker 170 to output feedbacks or various notifications according to various embodiments of the present disclosure in the form of audio.

According to an embodiment, the speaker 170 may include a plurality of speakers disposed at different locations. In this case, the processor 140 may control the playback state of the plurality of speakers based on the rotation direction of the mirror display 110. For example, three speakers may be provided at three corner areas of the mirror display 110. Based on the rotation direction of the mirror display 110 (e.g., detected using an acceleration sensor), one speaker may be controlled to be silent and only two speakers may be used.

The driver 180 may rotate the mirror display 110. For example, the driver 180 may be connected to a gear (e.g., a circular gear) coupled to the mirror display 110, and may rotate the mirror display 110 clockwise or counterclockwise by rotating the gear under the control of the processor 140. Alternatively, the driver 180 may stop rotation of the mirror display 110 by stopping rotation of the gear under control of the processor 140. The driver 180 may be implemented as various motors, such as a step motor, a direct current electric motor (DC motor), an alternating current electric motor (AC motor), or a brushless DC electric motor (BLDC) motor.

Figure 5:
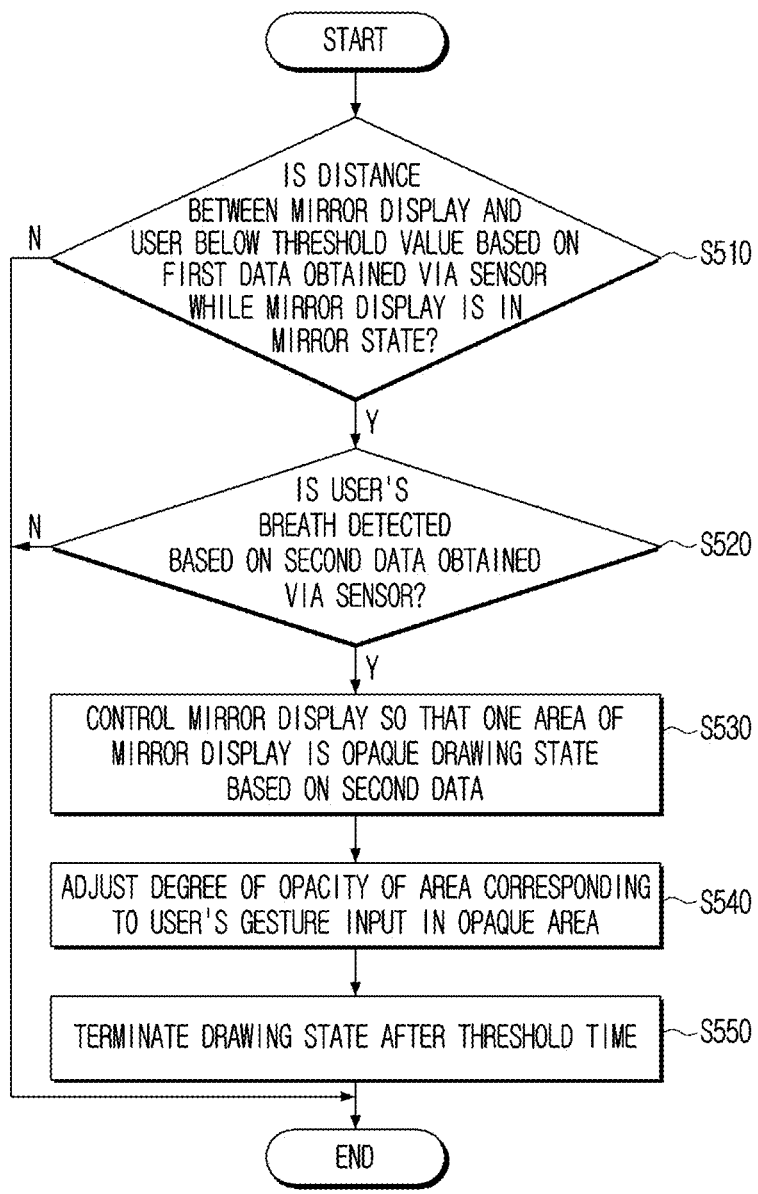
FIG. 5 is a view provided to explain a controlling method of an electronic apparatus according to one or more embodiments.

FIG. 5 is a view provided to explain a controlling method of an electronic apparatus according to one or more embodiments.

Referring to FIG. 5, the electronic apparatus 100 may identify whether the distance between the mirror display 110 and the user is below a predetermined value based on the first data obtained via the sensor 120 while the mirror display 110 is in the mirror state (S510).

Subsequently, when the distance between the mirror display 110 and the user is below a predetermined value (S510:Y), the electronic apparatus 100 may detect the user's breath based on the second data obtained via the sensor 120 (S520). For example, the electronic apparatus 100 may identify whether the user is exhaling based on the second data obtained via at least one of the camera, the microphone, the CO2 sensor, or the barometric pressure sensor. For example, the electronic apparatus 100 may identify whether the user is exhaling based on the mouth shape in an image of the user obtained via the camera. For example, the electronic apparatus 100 may identify whether the user is exhaling based on the user's exhaling sound included in the sound obtained via the microphone. For example, the electronic apparatus 100 may identify whether the user is exhaling based on the concentration of carbon dioxide obtained via the CO2 sensor. For example, the electronic apparatus 100 may identify whether the user is exhaling based on the pressure value obtained via the barometric pressure sensor.

According to an embodiment, the electronic apparatus 100 may identify whether the user is exhaling by inputting an image capturing the user obtained through the camera into an artificial intelligence model. According to an embodiment, the electronic apparatus 100 may identify whether the user is exhaling by inputting sound obtained thorough the microphone into an artificial intelligence model. According to an embodiment, the artificial intelligence model may be created through training. Here, 'being created through training' means that by applying a training algorithm to a large number of training data, predefined operation rules or artificial intelligence models of desired characteristics are crated. Such training may be accomplished in the device itself that performs artificial intelligence according to the present disclosure, or may be accomplished through a separate server and/or system. An artificial intelligence model may consist of a plurality of neural network layers. At least one layer has at least one weight value, and calculation of layers is performed through calculation result of the previous layer and at least one predefined calculation. Examples of the neural network include Convolutional Neural Network (CNN), Recurrent Neural Network (RNN), Deep Neural Network (DNN), Restricted Boltzmann Machine (RBM), Deep Belief Network (DBN), Bidirectional Recurrent Deep Neural Network (BRDNN), Deep Q-Networks, and transformer, and the neural network in the present disclosure is not limited to the above-described examples, except in cases where it is explicitly stated. The training algorithm is a method of training a predetermined target device (e.g., a robot) using a plurality of training data so that the target device can make decisions or predictions on its own. The examples of the training algorithm include supervised learning, unsupervised learning, semi-supervised learning, or reinforcement learning, and the training algorithm in the present disclosure is not limited to the above-described examples, except in cases where it is explicitly stated.

Subsequently, when the user's breath is detected (S520: Y), the electronic apparatus 100 may control the mirror display 110 so that one area of the mirror display 110 is in an opaque drawing state based on the second data (S530). The opaque drawing state is a state in which the one area is processed to be opaque and a drawing function is performable by the mirror display in the area.

The electronic apparatus 100 may then control the mirror display 110 to adjust the degree of opacity of the area corresponding to the user's gesture input in the opaque area (S540).

Subsequently, the electronic apparatus 100 may terminate the drawing state after a predetermined time (S550). For example, the electronic apparatus 100 may terminate the drawing state by returning the opaque area to its original state after a different amount of time depending on the intensity of the user's breath. For example, when the transparency of the opaque area decreased, the electronic apparatus 100 may increase the transparency of the opaque area to return it to its original state. For example, when the opaque area has changed to a display state and a particular color is displayed, the electronic apparatus 100 may return the corresponding area to its original state by switching to a mirror state.

According to an embodiment, the electronic apparatus 100 may increase the predetermined time to return to the original state as the breath intensity increases. For example, the electronic apparatus 100 may gradually increase transparency for a first time period when the breath intensity is first intensity and return the corresponding area to the original mirror state, and may gradually increase transparency for a second time period shorter than the first time period when the breath intensity is second intensity lower than the first intensity and return the corresponding area to the original mirror state.

Figure 6:
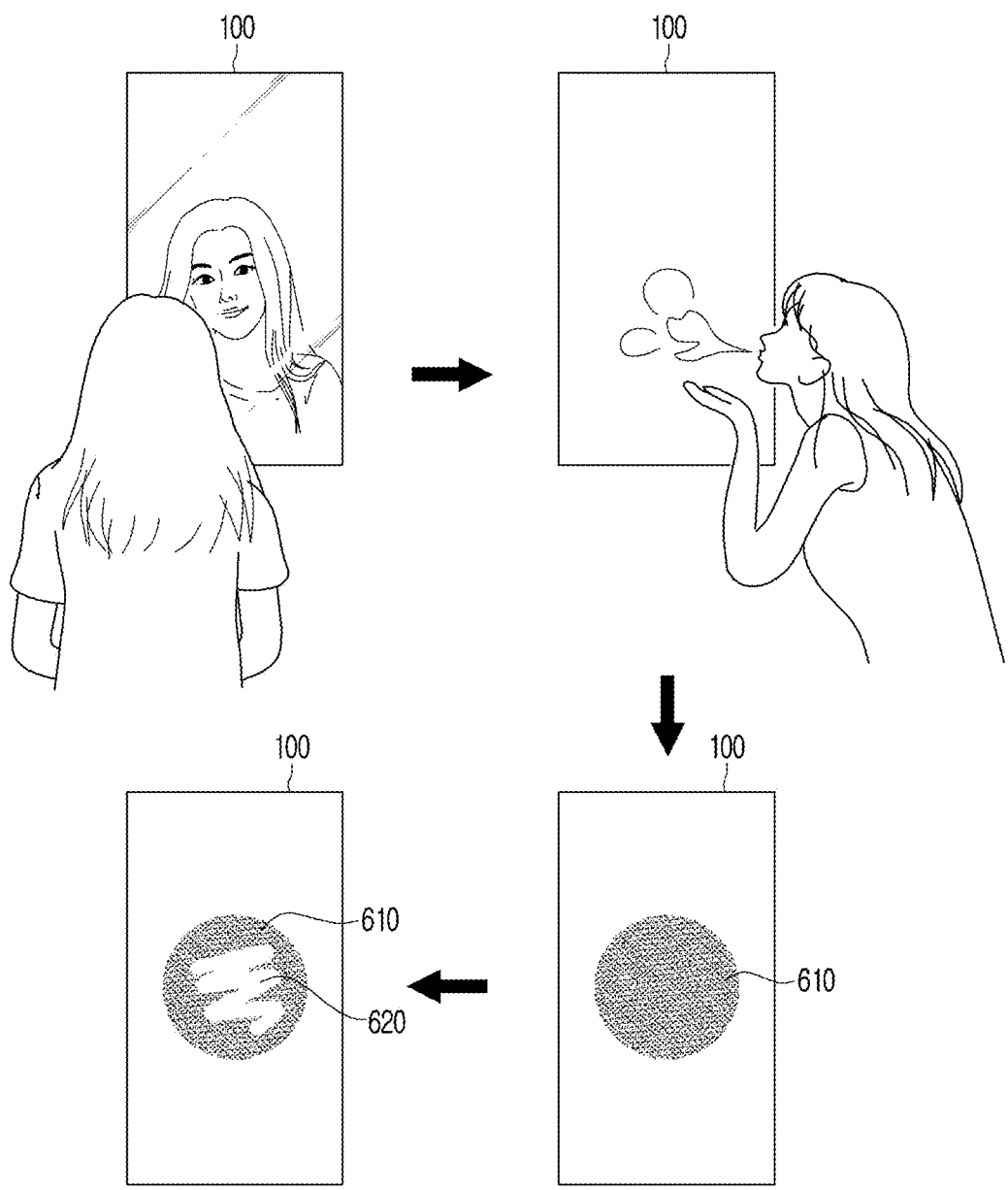
FIG. 6 is a view provided to explain a method of entering a drawing state according to one or more embodiments.

FIG. 6 is a view provided to explain a method of entering a drawing state according to one or more embodiments.

Referring to FIG. 6, when the mirror display 110 detects the user's breath in the mirror state, an area 610 may be processed to be opaque to enter the drawing state based on the user's mouth position. For example, the electronic apparatus 100 may decrease the transparency of the area 610 corresponding to the user's mouth position, thereby rendering the area opaque. However, the present disclosure is not limited thereto, and the electronic apparatus 100 may process the corresponding area to be opaque by switching the area 610 corresponding to the user's mouth position to the display state and displaying a particular color (e.g., a gray color).

When the electronic apparatus 100 enters the drawing state, a drawn area 620 may be processed to be transparent based on the user's drawing input for the opaque area 610. For example, the electronic apparatus 100 may increase the transparency of the area 620 drawn by the user to process the corresponding area to be transparent. However, the present disclosure is not limited thereto, and the electronic apparatus 100 may process the area 620 drawn by the user to be transparent by switching the area 620 to the mirror state.

Figure 7:
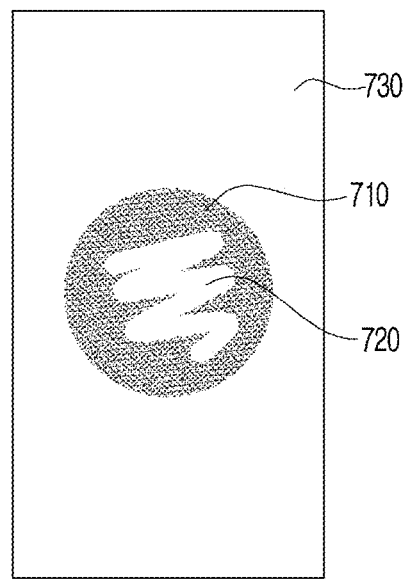
FIG. 7 is a view provided to explain a method of processing a drawing area according to one or more embodiments.

FIG. 7 is a view provided to explain a method of processing a drawing area according to one or more embodiments.

According to an embodiment, the electronic apparatus 100 may control the mirror display 110 so that the reflectivity of the opaque area corresponding to the user's gesture input is the same as the reflectivity of the area that is not processed to be opaque.

For example, as shown in FIG. 7, the electronic apparatus 100 may control the mirror display 110 so that the reflectivity of an area 720 corresponding to the user's gesture input in an opaque area 710 is the same as the reflectivity of the area 730 that is not processed to be opaque.

Figure 8:
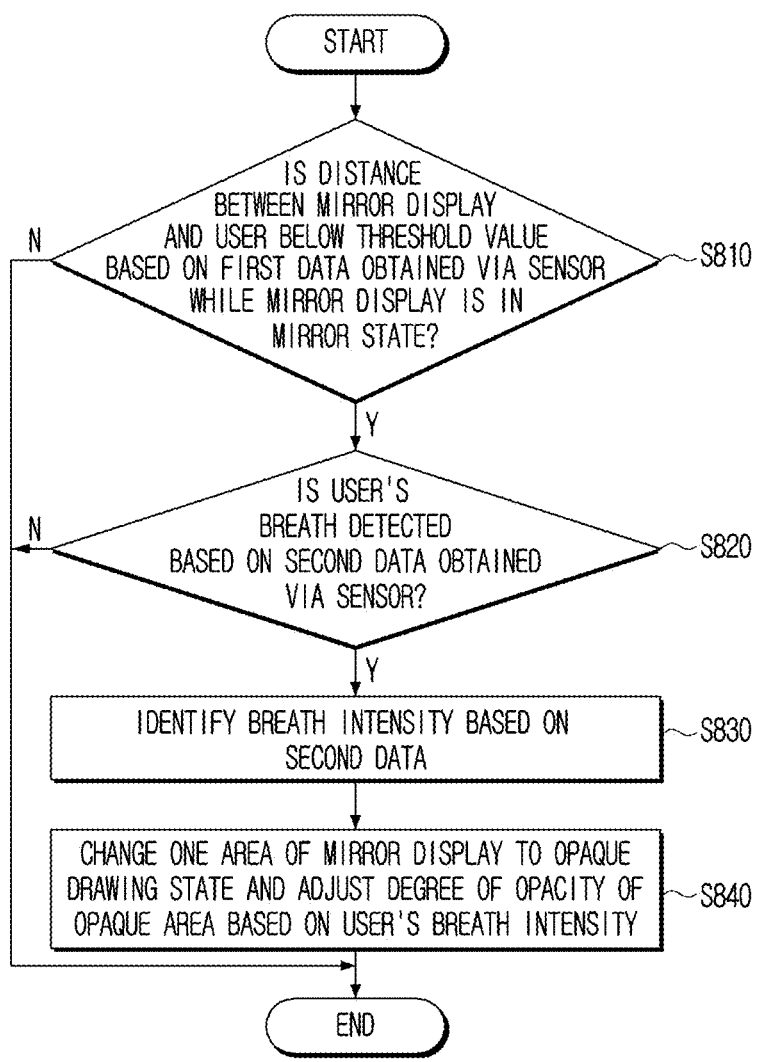
FIG. 8 is a view provided to explain a controlling method of an electronic apparatus according to one or more embodiments.

FIG. 8 is a view provided to explain a controlling method of an electronic apparatus according to one or more embodiments.

Referring to FIG. 8, the electronic apparatus 100 may identify whether the distance between the user and the mirror display 110 is below a predetermined value based on the first data obtained via the sensor 120 while the mirror display 110 is in the mirror state (S810).

Subsequently, when the distance between the user and the mirror display 110 is below a predetermined value (S810:Y), the electronic apparatus 100 may detect the user's breath based on the second data obtained via the sensor 120 (S820). For example, it may be possible to identify whether the user is exhaling based on the second data obtained via at least one of the camera, the microphone, the $CO_2$ sensor, or the barometric pressure sensor.

Subsequently, when the user's breath is detected (S820:Y), the electronic apparatus 100 may identify the intensity of the breath based on the second data (S830). For example, the breath intensity may be identified based on the second data obtained via at least one of the camera, the microphone, the $CO_2$ sensor, or the barometric pressure sensor. For example, the electronic apparatus 100 may identify the breath intensity based on the mouth shape in an image of the user obtained via the camera. For example, the electronic apparatus 100 may identify the breath intensity based on a loudness of the user's exhaling sound included in the sound obtained via the microphone. For example, the electronic apparatus 100 may identify the breath intensity based on the concentration of carbon dioxide obtained via the $CO_2$ sensor. For example, the electronic apparatus 100 may identify the breath intensity based on the pressure value obtained via the barometric pressure sensor.

According to an embodiment, the electronic apparatus 100 may identify whether the user is exhaling by inputting an image capturing the user obtained via the camera into an artificial intelligence model. According to an embodiment, the electronic apparatus 100 may input sound obtained via the microphone into an artificial intelligence model to identify whether the user is exhaling.

Subsequently, the electronic apparatus 100 may change one area of the mirror display 110 to an opaque drawing state, and may adjust the degree of opacity of the opaque area based on the identified breath intensity (S840). According to an embodiment, the electronic apparatus 100 may adjust the degree of opacity so that the stronger the breath intensity, the greater the degree of opacity. For example, when the breath intensity is first intensity, the degree of opacity may be processed to be value a, and when the breath intensity is second intensity that is lower than the first intensity, the degree of opacity may be processed to be value b that is smaller than the value a.

Figure 9:
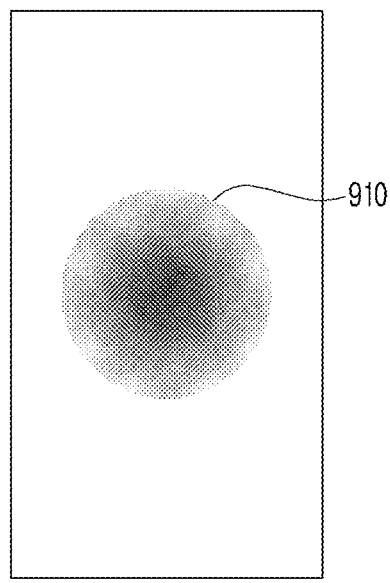
FIG. 9 is a view provided to explain a method of providing an opaque area according to one or more embodiments.

FIG. 9 is a view provided to explain a method of providing an opaque area according to one or more embodiments.

According to an embodiment, when it is identified that the user has exhaled, the electronic apparatus 100 may identify an area corresponding to the user's mouth based on an image capturing the user or sound obtained via the microphone. Subsequently, the electronic apparatus 100 may control the mirror display 110 so that the degree of opacity decreases as it extends outwardly from the area corresponding to the user's mouth based on the intensity of the user's breath.

For example, as shown in FIG. 9, the mirror display 110 may be controlled so that the area corresponding to the user's mouth in an entire opaque area 910 is processed to be the most opaque area with a maximum intensity of 100%, and the degree of opacity decreases toward the edge.

Figure 10:
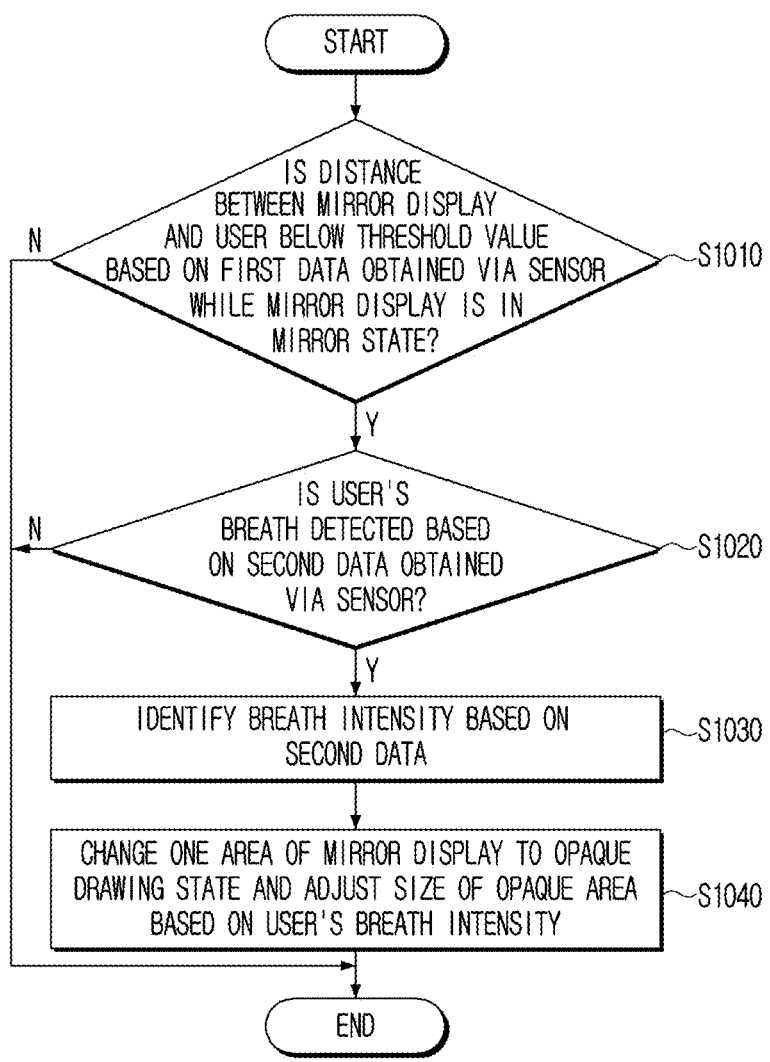
FIG. 10 is a view provided to explain a controlling method of an electronic apparatus according to one or more embodiments.

FIG. 10 is a view provided to explain a controlling method of an electronic apparatus according to one or more embodiments.

Referring to FIG. 10, the electronic apparatus 100 may identify whether the distance between the mirror display 110 and the user is below a predetermined value based on the first data obtained via the sensor 120 while the mirror display 110 is in the mirror state (S1010).

Subsequently, when the distance between the mirror display 110 and the user is below a predetermined value (S1010:Y), the electronic apparatus 100 may detect the user's breath based on the second data obtained via the sensor 120 (S1020). For example, it may be possible to identify whether the user is exhaling based on the second data obtained via at least one of the camera, microphone, CO2 sensor, or barometric pressure sensor.

Subsequently, when the user's breath is detected (S1020: Y), the electronic apparatus 100 may identify the intensity of the breath based on the second data (S1030). For example, the breath intensity may be identified based on the second data obtained via at least one of the camera, the microphone, the CO2 sensor, or the barometric pressure sensor. For example, the electronic apparatus 100 may identify the breath intensity based on the mouth shape in an image of the user obtained via the camera. For example, the electronic apparatus 100 may identify the breath intensity based on the loudness of the user's exhaling sound included in the sound obtained via the microphone. For example, the electronic apparatus 100 may identify the breath intensity based on the concentration of carbon dioxide obtained via the CO2 sensor. For example, the electronic apparatus 100 may identify the breath intensity based on the pressure value obtained via the barometric pressure sensor.

According to an embodiment, the electronic apparatus 100 may identify whether the user is exhaling by inputting an image capturing the user obtained via the camera into an artificial intelligence model. According to an embodiment, the electronic apparatus 100 may identify whether the user is exhaling by inputting sound obtained via the microphone into an artificial intelligence model.

Subsequently, the electronic apparatus 100 may change one area of the mirror display 110 to an opaque drawing state, and may adjust the size of the opaque area based on the identified breath intensity (S1040). According to an embodiment, the electronic apparatus 100 may adjust the size of the opaque area so that the stronger the breath intensity, the larger the size of the opaque area.

Figure 11:
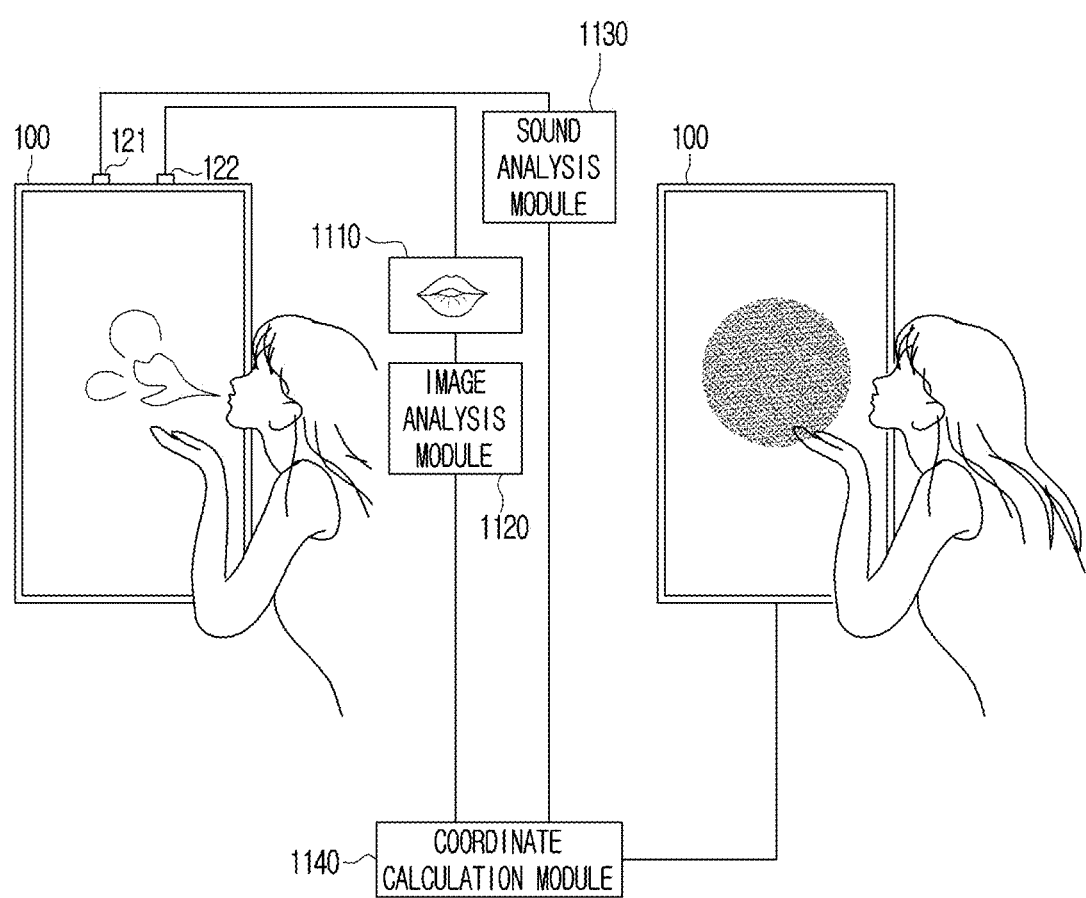
FIG. 11 is a view provided to explain a controlling method of an electronic apparatus according to one or more embodiments.

FIG. 11 is a view provided to explain a controlling method of an electronic apparatus according to one or more embodiments.

Referring to FIG. 11, the electronic apparatus 100 may detect the user's breath based on at least one of sound obtained via a microphone 121 or an image obtained via a camera 122. Further, the electronic apparatus 100 may identify the intensity of the user's breath based on at least one of the sound obtained via the microphone 121 or the image obtained via the camera 122.

According to an embodiment, the electronic apparatus 100 may analyze the captured image obtained via the camera 122 through an image analysis module 1120 and/or may analyze the sound obtained via the microphone 121 through a sound analysis module 1130. For example, the image analysis module 1120 and the sound analysis module 1130 may analyze the captured image obtained via the camera 122 and/or the sound obtained via the microphone 121 using a preset image analysis technique, sound analysis technique, trained artificial intelligence model, etc.

Subsequently, the electronic apparatus 100 may calculate coordinates corresponding to the user's mouth on the mirror display 110 based on the analysis results of the image analysis module 1120 and/or the analysis results of the sound analysis module 1130. For example, the electronic apparatus 100 may utilize a coordinate calculation module 1140 to calculate coordinates of the area on the mirror display 110 corresponding to the user's mouth. For example, the image analysis module 1120 may identify the user's mouth based on the mouth shape, and calculate coordinates corresponding to the user's mouth on the mirror display 110 based on a distance from the user's mouth.

Subsequently, the electronic apparatus 100 may change an area of a certain size centered on the coordinates of the area corresponding to the user's mouth on the mirror display 110 to an opaque drawing state. The specific size may be preset, or may be determined based on the intensity of the user's breath, the proximity of the user, or the like.

According to another embodiment, the position of the user's mouth may be identified by identifying the position of the breath using under display presser sensor.

Figure 12:
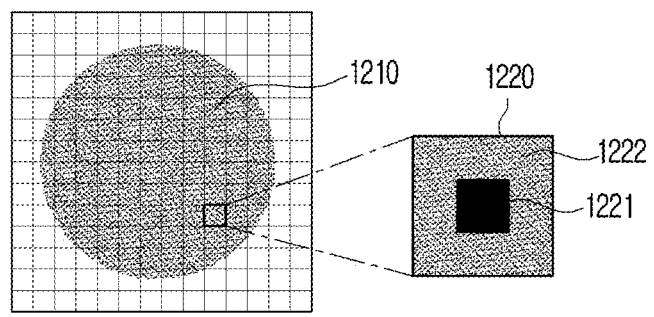
FIG. 12 is a view provided to explain a structure of a mirror display according to one or more embodiments.

FIG. 12 is a view provided to explain a structure of a mirror display according to one or more embodiments.

According to an embodiment, the mirror display 110 may include a plurality of pixel areas, and each of the plurality of pixel areas may be configured to have a display element located in the center and a mirror element located on the border.

For example, as shown in FIG. 12, each pixel area constituting a display 1210 may be implemented with a display element 1221 located in the center and a mirror element 1222 located on the border. In this case, an object may be reflected thorough the mirror element 1222 even if the object is processed to be opaque, thereby creating a blurred effect.

According to an embodiment, the electronic apparatus 100 may process one area of the mirror display 110 to be opaque by controlling the display element 1221 to display a first color. For example, the first color may be, but is not limited to, a gray color.

According to an embodiment, the electronic apparatus 100 may increase the reflectivity of the area corresponding to the user's gesture input by controlling the display element 1221 to display a second color. For example, the second color may be a transparent color as much as possible. According to another embodiment, the display element 1221 may be turned off so that the reflectivity of the area corresponding to the user's gesture input is increased.

By using the display structure described above, the area of the breath at the recognized location may be represented as a motion graphic with transparency applied, so that a visual effect where the breath effect is applied as an object is reflected can be created. For example, even if one area is processed to be opaque according to the user's breath, an object may be reflected through the mirror element 1222 of the corresponding area, thereby creating a blurred effect.

Figure 13:
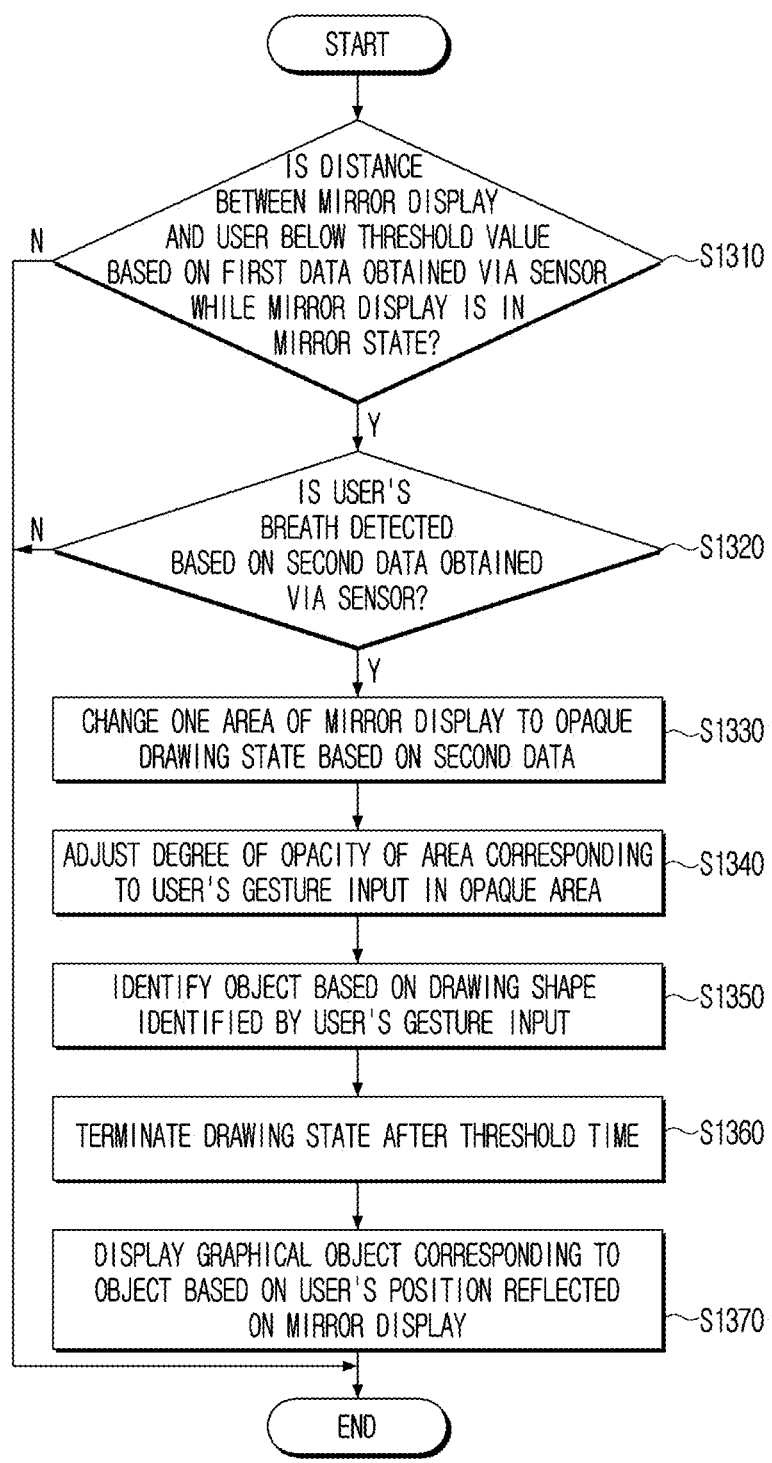
FIG. 13 is a view provided to explain a controlling method of an electronic apparatus according to one or more embodiments.

FIG. 13 is a view provided to explain a controlling method of an electronic apparatus according to one or more embodiments.

Referring to FIG. 13, the electronic apparatus 100 may identify whether the distance between the mirror display 110 and the user is below a predetermined value based on the first data obtained via the sensor 120 while the mirror display 110 is in the mirror state (S1310).

Subsequently, when the distance between the mirror display 110 and the user is below a predetermined value, the electronic apparatus 100 may detect whether the user is exhaling based on the second data obtained via the sensor 120 (S1320). For example, the electronic apparatus 100 may identify whether the user is exhaling based on the second data obtained via at least one of the camera, the microphone, the CO2 sensor, or the barometric pressure sensor.

Subsequently, when the user's breath is detected (S1320: Y), the electronic apparatus 100 may control the mirror display 110 to change one area of the mirror display 110 to an opaque drawing state based on the second data (S1320: Y).

The electronic apparatus 100 may then control the mirror display 110 to adjust the degree of opacity of the area corresponding to the user's gesture input in the opaque area (S1340).

Subsequently, the electronic apparatus 100 may identify an object based on a drawing shape identified by the user's gesture input in the drawing state (S1350).

The electronic apparatus 100 may then terminate the drawing state by returning the opaque area to its original state after a predetermined time (S1360).

Subsequently, the electronic apparatus 100 may display a graphical object corresponding to the identified object based on the user's position in the mirror display 110 (S1370). For example, the electronic apparatus 100 may display the graphical object on the corresponding area by switching the area where the graphical object is displayed to a display state.

According to an embodiment, the electronic apparatus 100 may identify a relationship with the user based on the type of object identified in the drawing state, and control the mirror display 110 to display a graphical object corresponding to the object based on the relationship with the user and the position of the user reflected on the mirror display.

Figure 14:
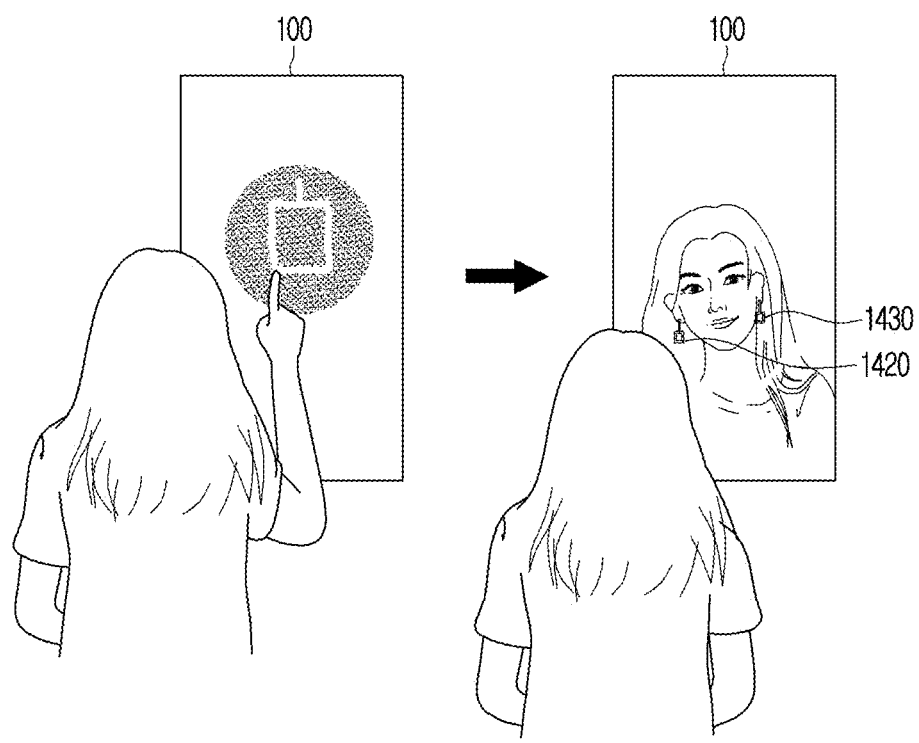
FIG. 14 is a view provided to explain a method of utilizing a drawing object according to one or more embodiments.

FIG. 14 is a view provided to explain a method of utilizing a drawing object according to one or more embodiments.

Referring to FIG. 14, when an earring is identified based on a drawing shape identified by the user's gesture input in the drawing state, the electronic apparatus 100 may display the earring graphics 1420, 1430 corresponding to the identified object.

According to an embodiment, when the electronic apparatus 100 displays the earring graphics, the position of the displayed earring graphics may be moved in response to a user input (e.g., a touch input) and displayed. For example, the user may move the earring graphics 1420, 1430 to the position of his or her ear reflected on the mirror display 110.

According to another embodiment, when the identified object is identified as an earring accessory based on a drawing shape identified by the user's gesture input in the drawing state, the electronic apparatus 100 may display the earring graphics 1420, 1430 at a location of the user's ear reflected on the mirror display. For example, the electronic apparatus 100 may predict the shape of the user reflected on the mirror display 110 based on an image of the user obtained via the camera and a distance from the user, and display the earring graphics 1420, 1430 at the predicted location of the user's ear.

Meanwhile, according to an embodiment, the electronic apparatus 100 may transmit text, object shape, and the like identified based on the drawing in the drawing state to an external device in the form of a message or emoji. For example, when text is entered through the drawing state of the mirror display of a vehicle window, the electronic apparatus 100 may recognize the text and transmit a message to an external device in response to a user command. For example, when a heart shape is entered through the drawing state of the mirror display of a mobile phone, the electronic apparatus 100 may recognize the heart shape and transmit an emoji to an external device in response to a user command.

According to various embodiments described above, the user may experience the drawing state through the mirror state.

Meanwhile, the methods according to various embodiments of the present disclosure described above may be implemented by software upgrade to the existing electronic apparatuses, or by hardware upgrade alone.

In addition, the various embodiments of the disclosure described above may also be performed through an embedded server provided in the electronic apparatus or an external server of the electronic apparatus.

Meanwhile, according to an embodiment, the above-described various embodiments may be implemented as software including instructions stored in machine-readable storage media, which can be read by machine (e.g.: computer). The machine refers to a device that calls instructions stored in a storage medium, and can operate according to the called instructions, and the device may include an electronic apparatus (e.g., electronic apparatus (A)) according to the aforementioned embodiments. In case an instruction is executed by a processor, the processor may perform a function corresponding to the instruction by itself, or by using other components under the control of the processor. An instruction may include a code that is generated or executed by a compiler or an interpreter. The machine-readable storage medium may be provided in a form of a non-transitory storage medium. Here, the term "non-transitory" means that the storage medium is tangible without including a signal, and does not distinguish whether data are semi-permanently or temporarily stored in the storage medium.

In addition, according to an embodiment, the above-described methods according to the various embodiments may be included and provided in a computer program product. The computer program product may be traded as a product between a seller and a purchaser. The computer program product may be distributed in a form of a storage medium (e.g., a compact disc read only memory (CD-ROM)) that may be read by the machine or online through an application store (for example, PlayStore™). In case of the online distribution, at least a portion of the computer program product may be at least temporarily stored in a storage medium such as a memory of a server of a manufacturer, a server of an application store, or a relay server or be temporarily generated.

Further, the components (e.g., modules or programs) according to various embodiments described above may include a single entity or a plurality of entities, and some of the corresponding sub-components described above may be omitted or other sub-components may be further included in the various embodiments. Alternatively or additionally, some components (e.g., modules or programs) may be integrated into one entity and perform the same or similar functions performed by each corresponding component prior to integration. Operations performed by the modules, the programs, or the other components according to the various embodiments may be executed in a sequential manner, a parallel manner, an iterative manner, or a heuristic manner, or at least some of the operations may be performed in a different order or be omitted, or other operations may be added.

Although preferred embodiments of the present disclosure have been shown and described above, the disclosure is not limited to the specific embodiments described above, and various modifications may be made by one of ordinary skill in the art without departing from the gist of the disclosure as claimed in the claims, and such modifications are not to be understood in isolation from the technical ideas or prospect of the disclosure.

What is claimed is:

1. An apparatus comprising:
a mirror display;
one or more sensors;

one or more memories storing one or more instructions; and
one or more processors configured to, by executing the one or more instructions:
while the mirror display is in a mirror state in which the mirror display performs a mirror function,
based on a distance between the mirror display and a user being less than a predetermined value identified from first data obtained via one or more sensors of the one or more sensors, and breath of the user detected from second data obtained via one or more sensors of the one or more sensors,
control the mirror display so that an area of the mirror display is in an opaque drawing state in which the area is processed to be opaque and a drawing function is performable by the mirror display in the area, and
control the mirror display to adjust a degree of opacity of an area corresponding to a gesture input of the user in the area that is in the opaque drawing state, to thereby perform the drawing function.

2. The apparatus as claimed in claim 1, wherein
the one or more sensors include at least one of a camera, a microphone, a $CO_2$ sensor, or a barometric pressure sensor, that obtains the second data; and
the one or more processors are configured to, by executing the one or more instructions:
identify intensity of the breath from the second data, and
control the mirror display to adjust a degree of opacity of the area that is in the opaque drawing state based on the intensity of the breath.

3. The apparatus as claimed in claim 2, wherein the one or more processors are configured to, by executing the one or more instructions:
based on detecting the breath, identify an area corresponding to a mouth of the user based on an image of the user, and
control the mirror display so that the degree of opacity decreases, based on the intensity of the breath, as opacity extends outwardly from the area corresponding to the mouth.

4. The apparatus as claimed in claim 2, wherein the one or more processors are configured to, by executing the one or more instructions:
based on detecting the breath, identify an area corresponding to a mouth of the user based on sound received through a microphone, and
control the mirror display so that the degree of opacity decreases, based on the intensity of the breath, as opacity extends outwardly from the area corresponding to the mouth.

5. The apparatus as claimed in claim 1, wherein
the one or more sensors include at least one of a camera, a microphone, a $CO_2$ sensor, or a barometric pressure sensor, that obtains the second data, and
the one or more processors are configured to, by executing the one or more instructions:
identify intensity of the breath based on the second data, and
control the mirror display to adjust a size of the area that is in the opaque drawing state based on the intensity of the breath.

6. The apparatus as claimed in claim 1, wherein the one or more processors are configured to, by executing the one or more instructions:
control the mirror display so that reflectivity of the area corresponding to the gesture input in the area that is in the opaque drawing state is the same as reflectivity of an area of the mirror display that is outside of the area that is in the opaque drawing state and not controlled to be opaque.

7. The apparatus as claimed in claim 1, wherein the one or more processors are configured to, by executing the one or more instructions:
control the mirror display to terminate the opaque drawing state by returning the area that is in the opaque drawing state to an original state after different time periods according to intensities of the breath, respectively.

8. The apparatus as claimed in claim 1, wherein the one or more processors are configured to, by executing the one or more instructions:
identify an object based on a drawing shape indicated by the gesture input, and
control the mirror display to display a graphic object corresponding to the object based on a location of the user reflected on the mirror display.

9. The apparatus as claimed in claim 8, wherein the one or more processors are configured to, by executing the one or more instructions:
identify a relationship with the user based on a type of the identified object, and
control the mirror display to display a graphic object corresponding to the object based on the relationship with the user and the location of the user reflected on the mirror display.

10. The apparatus as claimed in claim 1, wherein
the mirror display includes a plurality of pixel areas,
each pixel area of the plurality of pixel areas is configured so that a display element is positioned in a center of the pixel area and a mirror element is positioned at a border of the pixel area, and
the one or more processors are configured to, by executing the one or more instructions:
process the area that is in the opaque drawing state to be opaque by controlling at least one display element of at least one pixel area in the area that is in the opaque drawing state of the plurality of pixel areas to display a first color, and
control at least one display element of at least one pixel area in the area that is in the opaque drawing state of the plurality of pixel areas to display a second color or to be turned off so that reflectivity of the area corresponding to the gesture input increases.

11. A method of an apparatus including a mirror display and one or more sensors, the method comprising:
while the mirror display is in a mirror state in which the mirror display performs a mirror function,
based on a distance between the mirror display and a user being less than a predetermined value identified from first data obtained via one or more sensors of the one or more sensors, and breath of the user detected from second data obtained via one or more sensors of the one or more sensors,
controlling the mirror display so that an area of the mirror display is in an opaque drawing state in which the area is processed to be opaque and a drawing function is performable by the mirror display in the area, and
controlling the mirror display to adjust a degree of opacity of an area corresponding to a gesture input of the user in the area that is in the opaque drawing state, to thereby perform the drawing function.

12. The method as claimed in claim 11, wherein
the one or more sensors include at least one of a camera, a microphone, a $CO_2$ sensor, or a barometric pressure sensor, that obtains the second data; and
the method further comprises:
identifying intensity of the breath based on the second data; and
adjusting a degree of opacity of the area that is in the opaque drawing state based on the intensity of the breath.

13. The method as claimed in claim 12, further comprising:
based on detecting the breath, identifying an area corresponding to a mouth of the user based on an image of the user; and
controlling the mirror display so that the degree of opacity decreases, based on the intensity of the breath, as opacity extends outwardly from the area corresponding to the mouth.

14. The method as claimed in claim 11, wherein
the one or more sensors include at least one of a camera, a microphone, a $CO_2$ sensor, or a barometric pressure sensor, that obtains the second data, and
the method further comprises:
identifying intensity of the breath based on the second data; and
adjusting a size of the area that is in the opaque drawing state based on the intensity of the breath.

15. A non-transitory computer-readable medium storing computer instructions that, when executed by one or more processors of an apparatus that includes a mirror display and one or more sensors, cause the apparatus to:
while the mirror display is in a mirror state in which the mirror display performs a mirror function,
based on a distance between the mirror display and a user being less than a predetermined value identified from first data obtained via one or more sensors of the one or more sensors, and breath of the user detected from second data obtained via one or more sensors of the one or more sensors, breath of the user,
control the mirror display so that an area of the mirror display is in an opaque drawing state in which the area is processed to be opaque and a drawing function is performable by the mirror display in the area, and
control the mirror display to adjust a degree of opacity of an area corresponding to a gesture input of the user in the area that is in the opaque drawing state, to thereby perform the drawing function.

16. The non-transitory computer-readable medium as claimed in claim 15, wherein
the one or more sensors include at least one of a camera, a microphone, a $CO_2$ sensor, or a barometric pressure sensor, that obtains the second data; and
the instructions cause the apparatus to:
identify intensity of the breath based on the second data; and
adjust a degree of opacity of the area that is in the opaque drawing state based on the intensity of the breath.

17. The non-transitory computer-readable medium as claimed in claim 16, wherein
the instructions cause the apparatus to:
based on detecting the breath, identify an area corresponding to a mouth of the user based on sound received through a microphone, and
control the mirror display so that the degree of opacity decreases, based on the intensity of the breath, as opacity extends outwardly from the area corresponding to the mouth.

18. The non-transitory computer-readable medium as claimed in claim 15, wherein
the one or more sensors include at least one of a camera, a microphone, a $CO_2$ sensor, or a barometric pressure sensor, that obtains the second data, and
the instructions cause the apparatus to:
identify intensity of the breath based on the second data; and
adjust a size of the area that is in the opaque drawing state based on the intensity of the breath.

19. The non-transitory computer-readable medium as claimed in claim 15, wherein
the instructions cause the apparatus to:
based on detecting the breath, identify an area corresponding to a mouth of the user based on an image of the user; and
control the mirror display so that the degree of opacity decreases, based on the intensity of the breath, as opacity extends outwardly from the area corresponding to the mouth.

20. The non-transitory computer-readable medium as claimed in claim 15, wherein the instructions cause the apparatus to:
control the mirror display so that reflectivity of the area corresponding to the gesture input in the area that is in the opaque drawing state is the same as reflectivity of an area of the mirror display that is outside of the area that is in the opaque drawing state and not controlled to be opaque.

\* \* \* \* \*